Feb. 26, 1935.  F. P. RYDER  1,992,398
METHOD OF LOOSENING THE SKINS OF TOMATOES
Filed Nov. 24, 1931
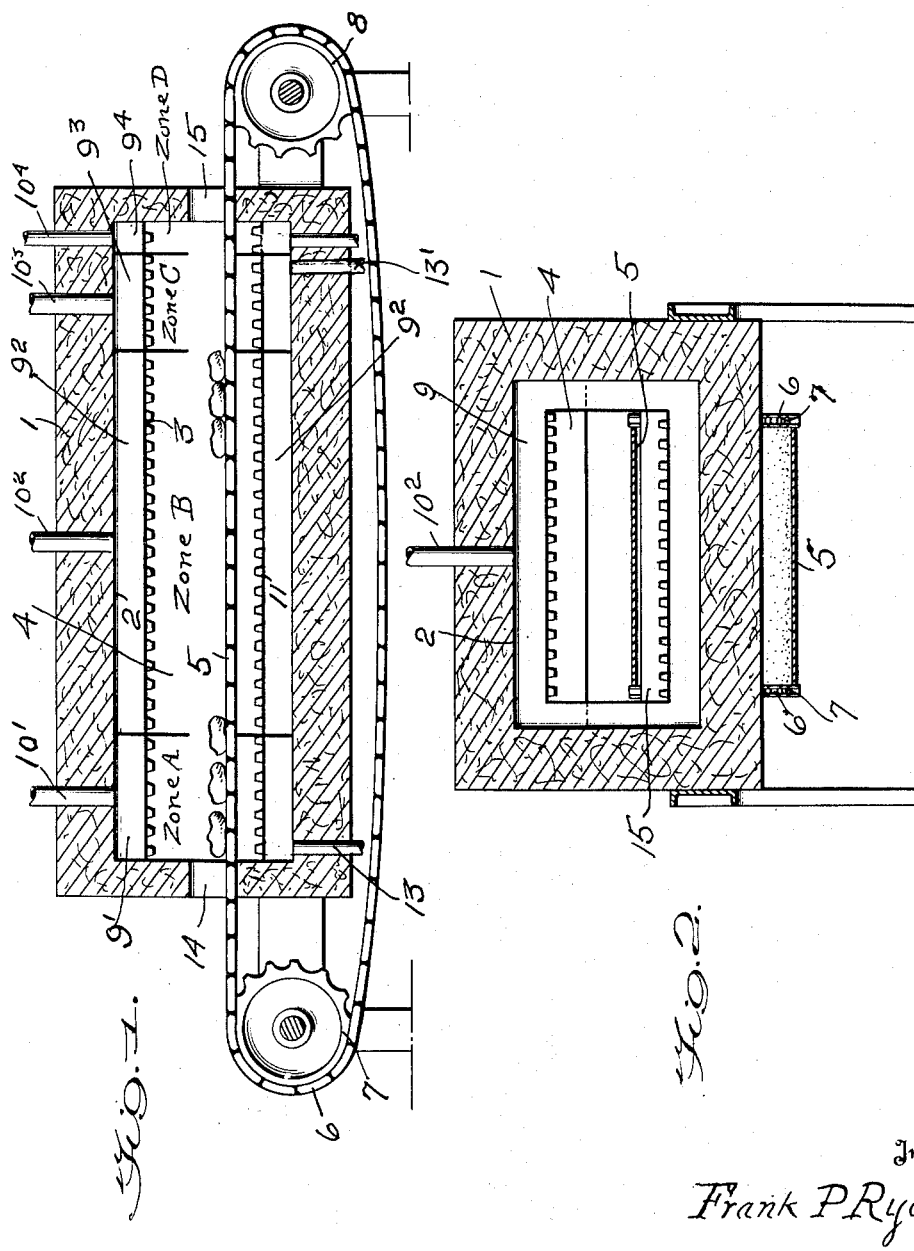
Inventor
Frank P Ryder
By A. P. Greeley
Attorney Patented Feb. 26, 1935

1,992,398

UNITED STATES PATENT OFFICE 1,992,398

METHOD OF LOOSENING THE SKINS OF TOMATOES

Frank P. Ryder, Niagara Falls, N. Y.

Application November 24, 1931, Serial No. 577,122

6 Claims. (Cl. 146—47)

My invention relates to the art of skinning tomatoes and other fruits and vegetables having a skin under which there are water cells.

The usual way of skinning tomatoes is by first subjecting them to scalding by hot water or wet steam to loosen the skin so that it may be peeled off by hand. Exposure to steam or scalding water does not loosen the skin completely, particularly in green spots. Instead of the scalding with hot water or wet steam tomatoes have been subjected to burning or oxidization of the skin by highly heated gases such as gases of combustion from an open flame with free oxygen present. This process is difficult to control, and the burnt skin is black, leaving objectionable black specks on the surface which appear as objectionable discoloration in the canned product.

It is the purpose of my present invention to provide a method by which, on the one hand, complete loosening of the skin whether green or ripe can be accomplished by exposing the skin to a temperature that causes the water in the cells immediately under the skin to boil and burst these cells and to thus loosen the skin, and on the other hand, the charring of the skin and pulp which results from oxidizing the skin in a flame or hot gases with oxygen present may be avoided. With this purpose in view my invention consists in the process of loosening the skin of tomatoes or other fruits or vegetables hereinafter described and claimed.

Referring to the drawing, which is illustrative only and is not intended to limit the process of my invention to the particular apparatus shown or to any particular apparatus, Figure 1 is a central longitudinal sectional view of an apparatus adapted to carry out the process of my invention, and Figure 2 is an end view, partly broken away, of the apparatus shown in Figure 1.

In the drawing 1 indicates a chamber having its walls preferably of heat insulating material and having a lining 2 of sheet metal or other heat resisting material impervious to steam or gas. Within the lining 2 and spaced therefrom as shown is the wall 3 of an inner tunnel or chamber 4. Through this inner tunnel or chamber 4 extends a conveyor 5 here shown as comprising endless chains 6 carried by pairs of sprocket wheels 7 and 8 to one or the other of which suitable power may be applied. The purpose of the conveyor is to carry the tomatoes or other fruits or vegetables whose skin is to be loosened through the tunnel at such rate of speed as may be found desirable and any conveying means suitable for this purpose may be substituted for the particular conveyor shown. The conveyor is preferably of wire netting or other foraminous material adapted to permit steam or gas to pass through it.

Between the inner wall 2 of the outer chamber and the wall 3 of the inner tunnel is a substantial space 9, preferably extending above, below, and on both sides of the inner tunnel. This space 9 is separated by partitions into spaces $9^1$, $9^2$, $9^3$, and $9^4$, and each of these spaces is provided with an inlet pipe leading through the wall of the outer tunnel, the inlet pipes $10^1$ and $10^3$ of spaces $9^1$ and $9^3$ leading from a suitable supply of wet steam at a pressure approximately five pounds above atmospheric, inlet pipe $10^2$ leading from a suitable supply of superheated steam at high temperature, approximately 800 degrees F., and a pressure approximately five pounds in excess of that in inlet pipe $10^1$ and inlet pipe $10^4$ leading from a suitable supply of water at ordinary temperature.

The upper and lower portion of wall 3 of the inner tunnel 4 is provided with openings 11, for the passage of steam or water from the chambers $9^1$, $9^2$, $9^3$, and $9^4$, to the interior of the tunnel, these openings being shown as provided with nozzles 12. From the interior of the inner tunnel leads drain pipes 13 and $13^1$ to carry off any condensation from the steam in chambers $9^1$, and $9^3$.

The openings 14 and 15 in the end walls of the outer tunnel through which the conveyor passes are of sufficient size to permit free escape of air, gas or steam.

In the use of the apparatus thus described for carrying out my process saturated steam at approximately five pound pressure and at a temperature only slightly above 212 degrees F., is introduced into space $9^1$ through inlet pipe $10^1$ and through openings 11 into zone A of the inner tunnel in relatively large volume. Zone B is filled with superheated steam or hot neutral gas at a higher pressure than exists in zone A, hence steam admitted in volume through inlet $10^1$ fills zone A cannot pass through zone B but must rush to atmosphere through opening 14, sweeping zone A free of oxygen. Tomatoes placed on conveyor 5 will by the movement of the conveyor be carried through the steam rapidly escaping from opening 14 which sweeps them free of oxygen; into zone A containing an oxygen free atmosphere.

Further movement of the conveyor carries the tomatoes into zone B which is filled with superheated steam or gas supplied through inlet pipe 10², leading into space 9² and through openings 11 into the interior of the inner tunnel. The movement of the conveyor and the length of the space 9² is such that the tomatoes are subjected to the high temperature of the superheated steam for a short time only, preferably about ten seconds, this short exposure to the highly heated steam or gas causing the water in the cells immediately under the surface of the skin to boil and loosen it whether ripe or green. But, because of the absence of any oxygen in the atmosphere surrounding the tomatoes, no burning or blackening of the skin or flesh of the tomatoes occurs as happens when exposure to such temperature takes place in the presence of oxygen.

From zone B of high heat, the tomatoes are conveyed to zone C which, through inlet pipe 10³, space 9³, and openings 11, is supplied with neutral gas or wet steam at atmospheric pressure which cools the surfaces of the tomatoes to a temperature below that at which carbonization can take place. From zone C the tomatoes are conveyed to zone D where they are subjected to the further cooling action of water introduced through inlet pipe 10⁴ into space 9⁴ and through openings 11 into zone D.

The wet steam in zones A and C serve on the one hand to seal zone B against entrance of air carrying oxygen and, on the other hand, the pressure of the superheated steam in zone B serves to prevent the wet steam from entering zone B so that the only escape for the wet steam is through openings 14 and 15.

In place of the wet steam any neutral gas, that is, non-oxydizing gas, may be used, and any such gas may be used in place of the superheated steam in zone B.

It will, of course, be understood that while my process is particularly adapted and intended for use in skinning tomatoes, it is not intended to be limited to use on tomatoes as it may be applied to the loosening or removal of the skins of other fruits or vegetables from which it is desired to remove the skin without taking with it any of the pulp.

Having thus described my invention what I claim is:

1. The method of treating a tomato or other fruit in which a relatively soft pulp is enclosed in a relatively tough skin which consists in passing the tomato first through an atmosphere of wet steam, then through a body of gaseous medium heated to a temperature above 500 degrees F., and subsequently through a second atmosphere of wet steam.

2. The method of treating fruits or vegetables having a skin under which there are water cells to loosen the skin which consists in passing the fruit first through an atmosphere of wet steam eliminating free oxygen from contact with the skin and then subjecting it to an atmosphere free of oxygen above the temperature at which carbonization would take place if free oxygen were present.

3. The method of treating fruits or vegetables having a skin under which there are water cells to loosen the skin which consists in passing the fruit first through an atmosphere of wet steam eliminating free oxygen from contact with the skin and then subjecting it to an atmosphere free of oxygen above the temperature at which carbonization would take place if free oxygen were present and then subjecting it to a cooling medium.

4. The method of treating fruits or vegetables having a skin under which there are water cells to loosen the skin consisting in first passing the fruit through a gaseous medium free of oxygen at a temperature below that at which the skin would be carbonized, then passing it through a gaseous medium free of oxygen at a temperature above that at which the skin would be carbonized if free oxygen were present, and then passing it into a cooling medium.

5. The method of treating fruits or vegetables having a skin under which there are water cells to loosen the skin in first passing the fruit through a gaseous medium free of oxygen at a temperature below that at which the skin would be carbonized supplied in sufficient quantity to eliminate free oxygen from the surface of the skin, then passing it through a gaseous medium free of oxygen at a temperature above that at which the skin would be carbonized if free oxygen were present, and then passing into a cooling medium.

6. The method of treating fruits or vegetables having a skin under which there are water cells to loosen the skin consisting in first passing the fruit through wet steam at substantially atmospheric temperature supplied in sufficient quantity to eliminate free oxygen from contact with the skin, then passing it through a gaseous medium free of oxygen at a temperature above that at which the skin would be carbonized if free oxygen were present and then passing it into a cooling medium.

FRANK P. RYDER.